US010377285B2

(12) United States Patent
Soltner et al.

(10) Patent No.: US 10,377,285 B2
(45) Date of Patent: Aug. 13, 2019

(54) HEADREST ASSEMBLY FOR VEHICLE SEAT AND VEHICLE SEAT COMPRISING SUCH AN ASSEMBLY

(71) Applicant: Faurecia Sièges d'Automobile, Nanterre (FR)

(72) Inventors: Stephane Soltner, Mailleroncourt Charette (FR); Francois Lelievre, Antony (FR); David Gayon, Etrechy (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 15/699,445

(22) Filed: Sep. 8, 2017

(65) Prior Publication Data
US 2018/0065523 A1   Mar. 8, 2018

(30) Foreign Application Priority Data
Sep. 8, 2016 (FR) .................................... 16 58375

(51) Int. Cl.
*B60N 2/60* (2006.01)
*B60N 2/812* (2018.01)
*B60N 2/847* (2018.01)
*B60N 2/897* (2018.01)
*B60N 2/894* (2018.01)

(52) U.S. Cl.
CPC ............ *B60N 2/812* (2018.02); *B60N 2/60* (2013.01); *B60N 2/847* (2018.02); *B60N 2/894* (2018.02); *B60N 2/897* (2018.02)

(58) Field of Classification Search
CPC .......... B60N 2/812; B60N 2/847; B60N 2/60; B60N 2/894; B60N 2/897; B60N 2/80; B60N 2/806; B60N 2/809

USPC ................................................. 297/410, 391
See application file for complete search history.

(56) References Cited

U.S. PATENT DOCUMENTS

| 7,758,115 B2* | 7/2010 | Yamaguchi ............ B60N 2/888 297/216.12 |
| 2014/0145489 A1* | 5/2014 | Wang ..................... B60N 2/809 297/410 |

(Continued)

FOREIGN PATENT DOCUMENTS

| DE | 3200321 A1 | 7/1983 |
| EP | 1712407 A1 | 10/2006 |

(Continued)

OTHER PUBLICATIONS

French Search Report in French for application No. FR1658375, dated May 11, 2017, 8 pages.

*Primary Examiner* — Mark R Wendell
(74) *Attorney, Agent, or Firm* — Reising Ethington P.C.

(57) ABSTRACT

A headrest assembly for a vehicle seat includes two pins each extending along an adjustment direction between a lower end and an upper end, each of the two pins having a mounting portion comprising the lower end and adapted to be fixed to a backrest of a seat, an adjustment portion comprising the upper end, and an intermediate portion between the mounting portion and the adjustment portion. The seat further includes a support structure adapted to support the head of a user, and an interface made of overmolded plastic and interconnecting the intermediate portions of the two pins.

16 Claims, 5 Drawing Sheets

(56) References Cited

U.S. PATENT DOCUMENTS

| | | | | |
|---|---|---|---|---|
| 2015/0298372 A1* | 10/2015 | Bielsa | ................... | B60N 2/80 297/391 |
| 2017/0136924 A1* | 5/2017 | Wehling | ............... | B60N 2/4808 |
| 2017/0214988 A1* | 7/2017 | Ferretti | .................. | H04R 1/023 |
| 2018/0111523 A1* | 4/2018 | Alexandersson | ...... | B60N 2/829 |

FOREIGN PATENT DOCUMENTS

| | | |
|---|---|---|
| FR | 2987792 A1 | 9/2013 |
| FR | 3010951 A1 | 3/2015 |
| WO | WO2013188371 A1 | 12/2013 |

\* cited by examiner

HEADREST ASSEMBLY FOR VEHICLE SEAT AND VEHICLE SEAT COMPRISING SUCH AN ASSEMBLY

TECHNICAL FIELD

The present invention relates to headrest assemblies for vehicle seats and to vehicle seats comprising such assemblies.

BACKGROUND

There is a known headrest assembly comprising a single pin on which is mounted a support structure for supporting the head of a seat occupant, the support structure being for example height-adjustable relative to the backrest of the seat by sliding the pins of the headrest within the backrest structure. With such assemblies, it is necessary to adapt the structure of the backrests so that they can engage with the single pin of the headrests. Standard backrest structures are adapted for headrests comprising two pins. Such a modification results in a significant increase in manufacturing costs.

There is also a known headrest assembly comprising two pins on which the support structure is mounted, the support structure being for example height-adjustable. The pins of the headrest assembly are adapted to be arranged in housings provided in the backrest structure and to pass through a plastic plate integral with the backrest in order to improve the final appearance of the backrest.

Such a backrest-headrest assembly comprises a large number of parts, and is therefore long and expensive to manufacture and assemble. In particular, it is necessary to pre-assemble the plastic plate onto the backrest and to ensure that it is correctly aligned with the backrest housings in order to allow the headrest to be assembled onto the backrest.

SUMMARY

The present invention, in at least some embodiments, aims to resolve these above-identified disadvantages. In one or more embodiments, the present invention aims in particular to provide a head assembly which is more aesthetically pleasing, easier and less expensive to manufacture, and easy to use.

The invention therefore relates to a headrest assembly for a vehicle seat, comprising:
 two pins each extending substantially along an adjustment direction between a lower end and an upper end, each of the two pins having a mounting portion comprising the lower end and intended to be fixed to a backrest of a seat, an adjustment portion comprising the upper end, and an intermediate portion between the mounting portion and the adjustment portion,
 and a support structure adapted to support the head of a user.

The headrest assembly further comprises an interface made of overmolded plastic and interconnecting the intermediate portions of the two pins.

With these arrangements, the headrest assembly is simpler and less expensive to manufacture and is suitable for all standard backrests. It is thus possible to improve the shape and appearance of the intermediate portion of the pins, in particular by overmolding, without limiting the functions of the headrest.

In various embodiments of the invention, it is possible to make use of one or more of the following provisions as well:
 the headrest assembly further comprises an adjustment plate integrally secured to the adjustment portion of each of the two pins, the support structure being mounted so as to be adjustable in translation on the adjustment plate along the adjustment direction; the occupant of the seat can thus adjust the height of the headrest, thus improving the general comfort of the seat;
 the adjustment plate is made of plastic overmolded on the adjustment portion of each of the two pins; the adjustment plate is therefore simple and economical to create;
 the interface is overmolded as one piece on the pins along with the adjustment plate so as to form a support structure, the support structure being formed as a single piece; thus only one step is necessary for the manufacture of the support structure, reducing the overall cost of the headrest;
 the adjustment plate is at least partially overmolded by the interface;
 the two pins are of metal, and the intermediate portions of the pins are at least partially covered by the overmolded interface; the headrest thus has a general external appearance of a single-pin headrest while being suitable for the upper cross-members of standard backrest frames having two insertion holes for the headrest pins, so it is therefore unnecessary to modify the upper cross-members of backrest frames and there is no increase in the headrest manufacturing costs; in addition, the metal pins enable meeting safety constraints concerning headrest performance;
 the intermediate portions of the pins are completely covered by the overmolded interface;
 the interface is solid, improving the general strength of the headrest;
 the interface is overmolded as one piece on the intermediate portions of the pins;
 the intermediate portion of each pin has an offset area with a base extending in a transverse direction perpendicular to the adjustment direction and two bends connecting said base to the other pin portions extending along the adjustment direction; the overall appearance of the headrest is thus improved and the visibility for the other passengers of the vehicle is improved, while meeting safety constraints.

The invention also relates to a method for manufacturing a headrest assembly according to the invention, comprising at least one step consisting of:
 injection molding an interface of plastic material so as to interconnect two pins.

The method for manufacturing the headrest thus comprises few steps and then allows rapid assembly of the headrest onto the backrest of a seat, reducing the overall costs of said headrest.

In various embodiments of the method according to the invention, one or more of the following embodiments may possibly be used:
 two metal pins are placed in a mold in which the plastic injection molding is carried out in order to at least partially overmold the interface on an intermediate portion of each of the pins; overmolding operations are economical and enable reducing the overall cost of manufacturing the headrest,
 the method comprises at least one step consisting of plastic injection molding an adjustment plate while overmolding an adjustment portion of each of the pins;

an adjustment plate is placed in a mold in which the plastic injection molding is carried out in order to at least partially overmold the interface on the adjustment plate;

comprising at least the steps consisting of integrally securing the adjustment plate to an adjustment portion of the two metal pins so as to be integral therewith, placing in the mold the assembly formed by the adjustment plate and the two pins, and plastic injection molding the interface while overmolding the intermediate portion of the two pins and the adjustment plate.

The invention also relates to a seat comprising a backrest and a headrest assembly according to the invention, wherein the two pins are integral with the backrest.

Advantageously, the backrest comprises an upper part from which the pins extend and said upper part is covered (at least in the vicinity of the pins) by the interface, so that the interface makes it possible to conceal:

seams or other elements connecting the backrest cover where the pins of the headrest assembly pass through, the holes enabling the passage of the pins, and the padding under the cover.

Of course, the various features, variants, and/or embodiments of the present invention may be combined with one another in various combinations, to the extent that they are not incompatible with or exclusive to one another.

BRIEF DESCRIPTION OF DRAWINGS

The invention will be better understood and other features and advantages will become apparent by reading the following detailed description comprising an embodiment given by way of illustration with reference to the accompanying figures, presented as non-limiting examples, which may serve to understand the invention and the description of its implementation and, where appropriate, contribute to its definition, in which.

DETAILED DESCRIPTION

It should be noted that, in the figures, the structural and/or functional elements common to the various embodiments may have the same references. Unless otherwise stated, such elements have identical structural, dimensional, and material properties.

For clarity, only the elements useful to understanding the embodiments described are represented and will be detailed.

In the following description, when referring to absolute position qualifiers such as the terms "front", "rear", "top", "bottom", "left", "right", etc., or relative qualifiers such as the terms "above", "below", "upper", "lower", etc., or to orientation qualifiers, this is in reference to a seat, and in particular to a headrest, in a normal position of use in the ordinary direction of travel of the vehicle.

Figure 1:
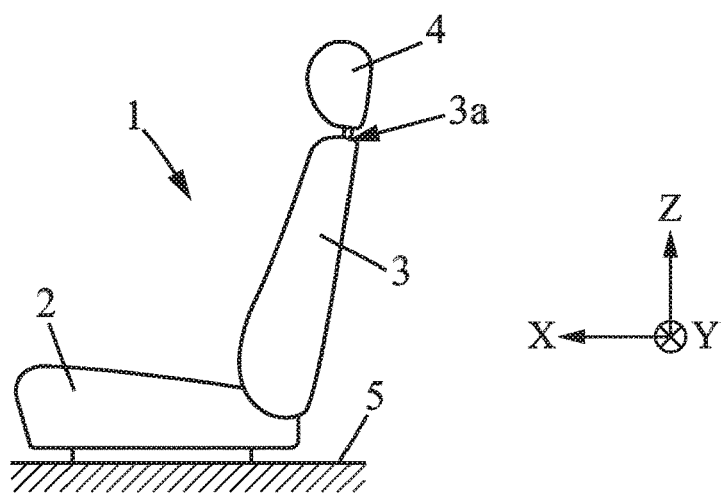
FIG. 1 is a schematic side view of a vehicle seat according to an embodiment of the invention.

FIG. 1 represents a seat 1 of a motor vehicle having a seating part 2 for receiving an occupant of the seat 1 and a backrest 3 carrying a headrest 4. The seating part 3 is fixed to a fixed structure 5, in particular to the floor of the vehicle.

Figure 2:
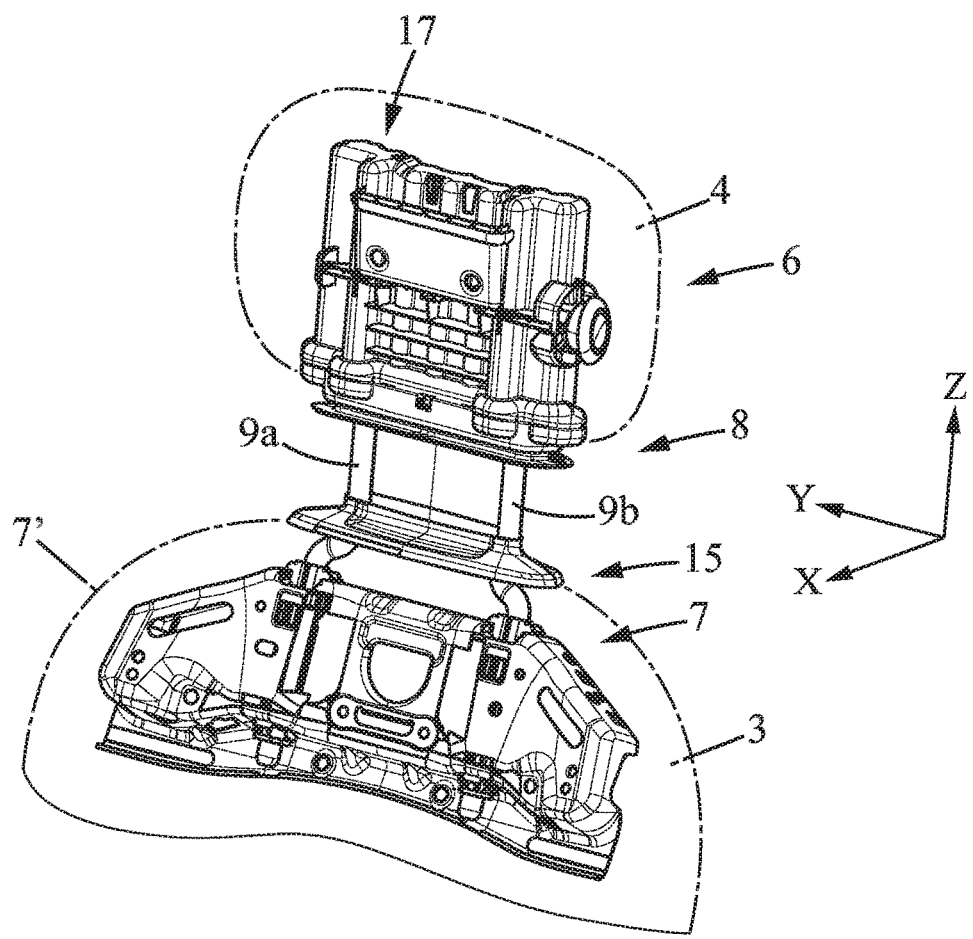
FIG. 2 is a perspective view of a headrest assembly according to an embodiment of the invention, comprising an interface partially covering the intermediate portions of the pins of the headrest assembly.
Figure 3:
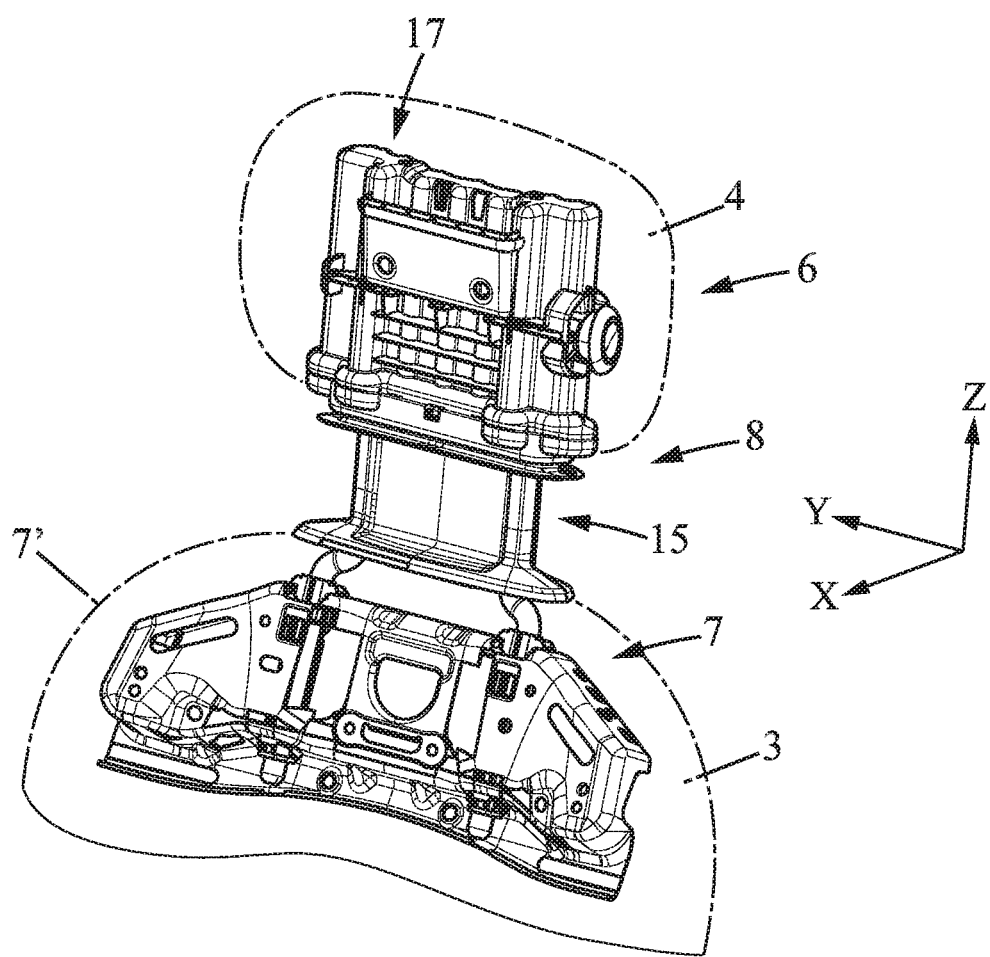
FIG. 3 is a perspective view of a headrest assembly according to an embodiment of the invention, comprising an interface completely covering the intermediate portions of the pins of the headrest assembly.

More specifically, the headrest 4 comprises a headrest assembly 6. As illustrated in FIG. 2, the headrest assembly 6 can be connected to a frame 7 of the backrest 3.

The frame 7 supports padding, for example covered by a cover 7' which constitutes the visible portion of the backrest 3 during normal use of the seat 1. The cover 7' therefore conceals the frame 7 and the padding. The padding and cover 7' assembly can generally be referred to as the upholstery.

The headrest assembly 6 is connected to the backrest 2 by means of a support structure 8. The support structure 8 comprises two pins 9a, 9b. The two pins 9a, 9b of the support structure 8 are parallel to each other, extending substantially along an adjustment direction Z. The two pins 9a, 9b have a generally cylindrical external cross-section. The two pins 9a, 9b are preferably metal, but may be of another material, such as plastic for example, or some other material. The two pins 9a, 9b respectively extend between an upper end 25a, 25b and a lower end 26a, 26b. The two pins 9a, 9b respectively comprise a mounting portion 14a, 14b comprising the lower end 26a, 26b. The mounting portion 14a, 14b is adapted to be fixed to the frame 7 of the backrest 3. The two pins 9a, 9b further respectively comprise an adjustment portion 16a, 16b comprising the upper end 25a, 25b. The two pins 9a, 9b further respectively comprise an intermediate portion 20a, 20b between the mounting portion 14a, 14b and the adjustment portion 16a, 16b.

In the raised position of the backrest, the two pins 9a, 9b extend upwards from an upper part 3a of the backrest (FIG. 1).

Alternatively, the support structure 8 may comprise a single metal tube of generally cylindrical external cross-section and having the shape of an inverted U. Each of the side walls of the U forms one of the arms 9a, 9b and can be divided into a mounting portion, an intermediate portion, and an adjustment portion. The base of the U forms a cross-member connecting the two side walls forming the pins 9a, 9b.

Each of the two pins 9a, 9b may be straight. More particularly, the upper end 25a, 25b and the lower end 26a, 26b of each of the two pins 9a, 9b are aligned along the same straight line.

Figure 4:
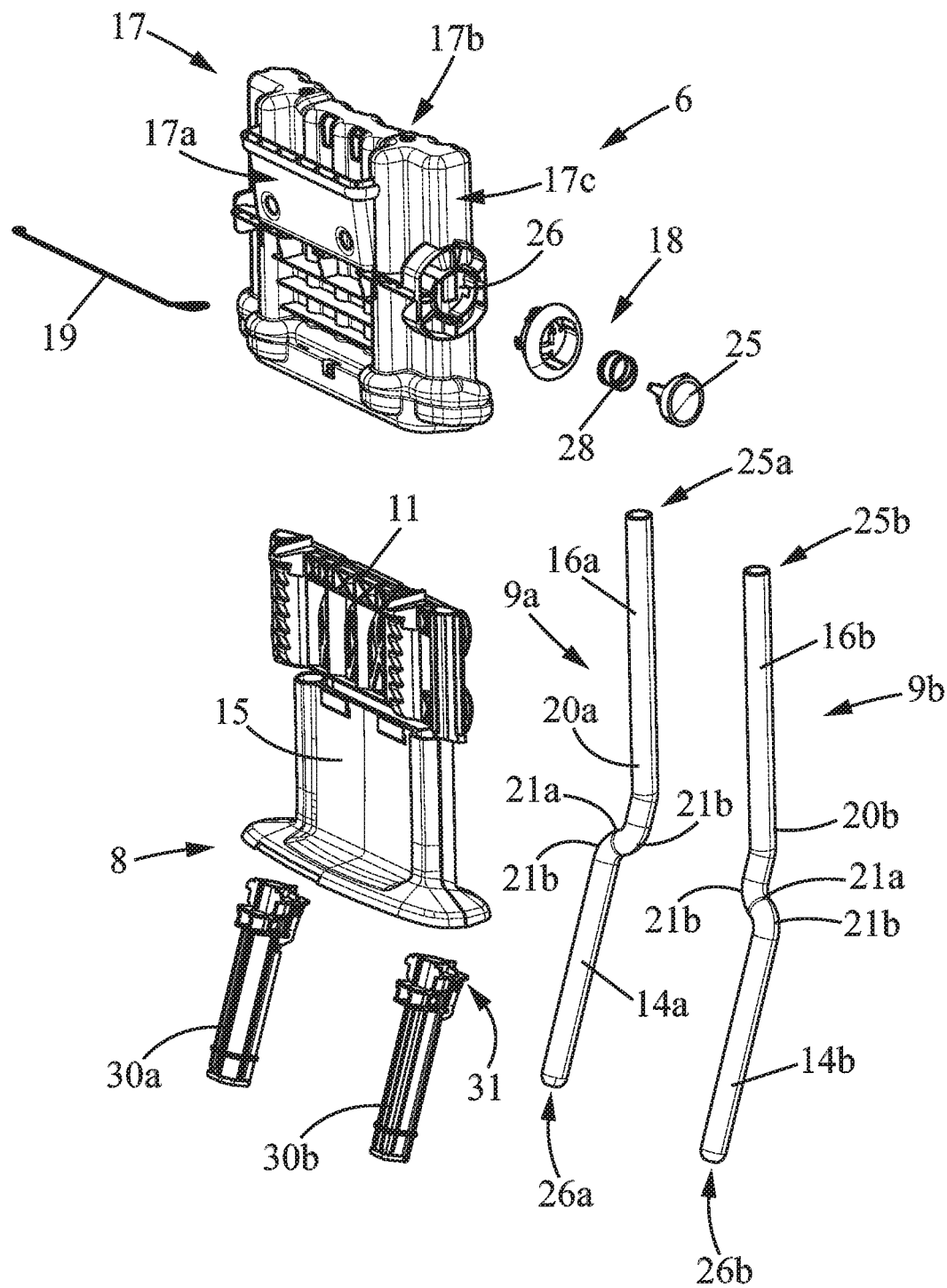
FIG. 4 is an exploded view of the headrest assembly of FIG. 3.
Figure 5A:
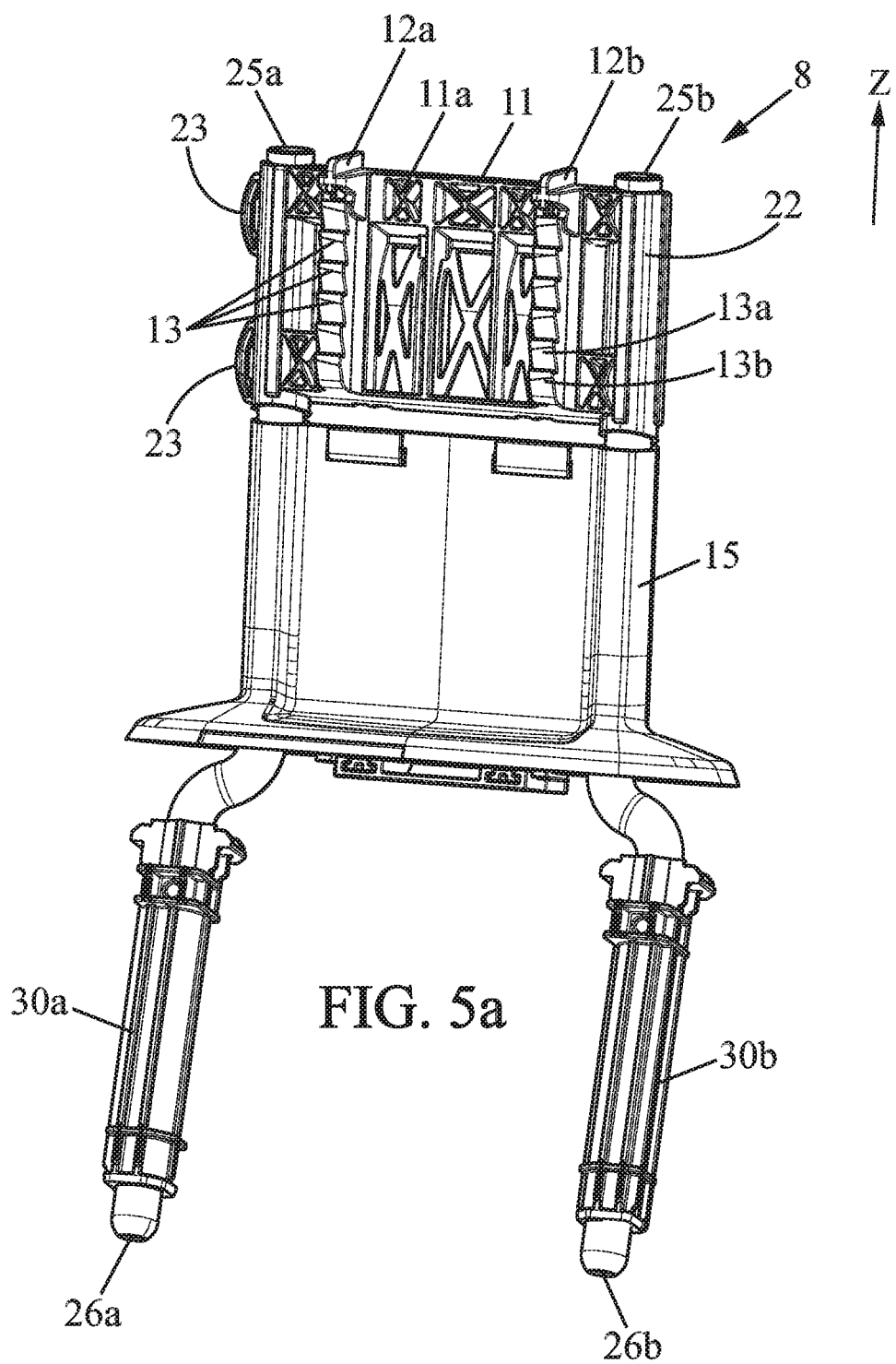
FIGS. 5a and 5b are a perspective rear and front views of a support structure of the headrest assembly of FIG. 3.
Figure 5B:
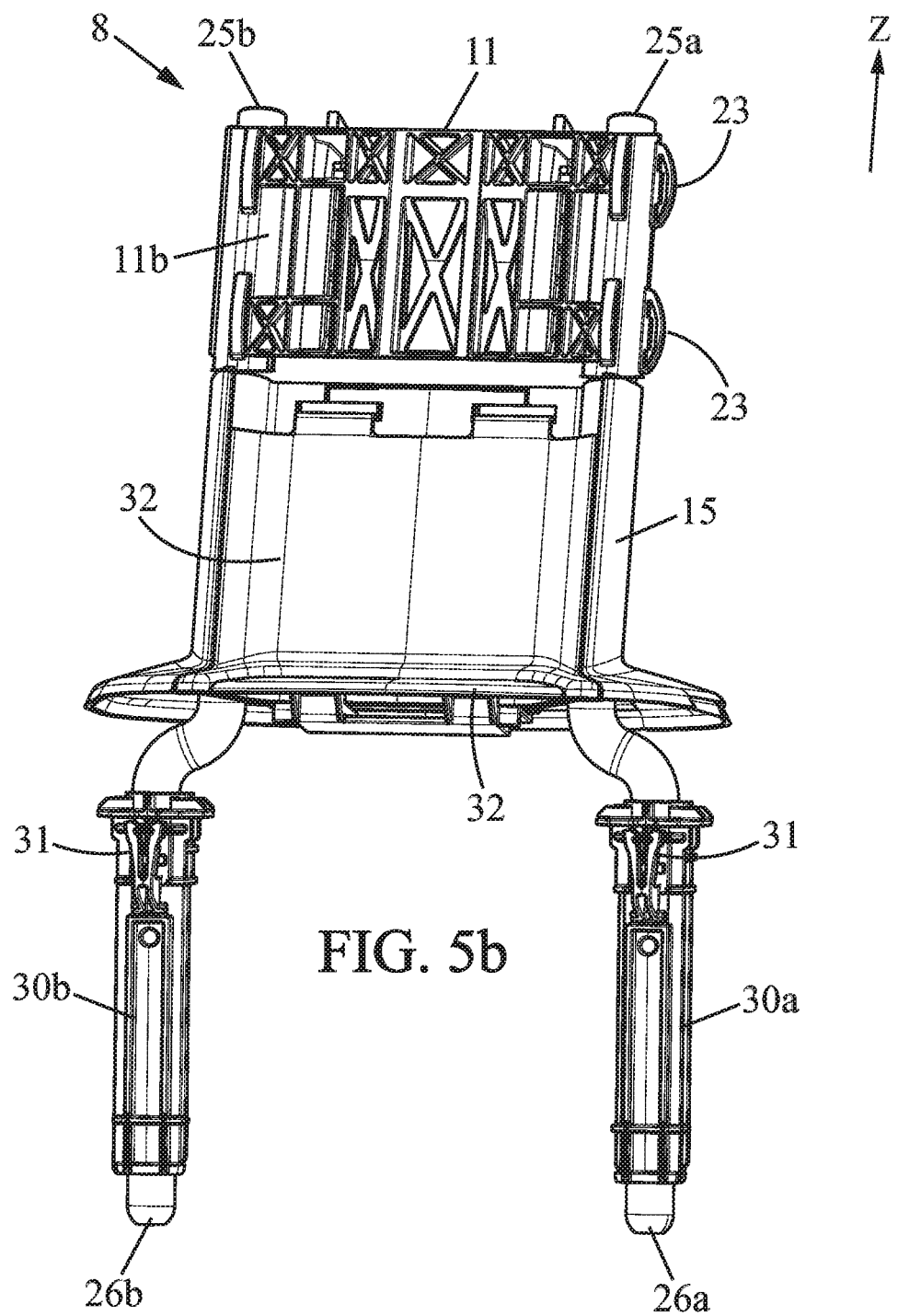

As a variant, and as represented in FIG. 4, the support structure 8 may comprise two pins 9a, 9b of generally cylindrical external cross-section and in which the intermediate portions 20a, 20b respectively comprise an offset area 21.

The offset area 21 comprises a base 21a extending in a transverse direction Y perpendicular to the adjustment direction Z, and two bends 21b connecting said base 21 to the other pin portions 9a, 9b extending in the adjustment direction Z.

Alternatively, the offset area 21 may have the shape of an inclined U. The offset area 21 comprises two lateral arms substantially parallel to the transverse direction, and a base substantially parallel to the adjustment direction Z and connecting the two lateral arms.

The support structure 8 may further comprise an adjustment plate 11. The adjustment plate 11 is, for example, a substantially rectangular plate having a front face 11a and a rear face 11b. The adjustment plate 11 extends in the transverse direction Y between the two pins 9a, 9b. The adjustment plate 11 is fixed in particular to the mounting portions 14a, 14b of the pins 9a, 9b. The adjustment plate 11 is thus integrally secured to the pins 9a, 9b.

The front face 11a of the adjustment plate 11 may comprise at least one toothed element, and in the embodiment shown, two toothed elements 12a, 12b, also called racks, comprising notches 13.

Each of the notches 13 may comprise, for example, an abutment portion 13a having a surface perpendicular to the adjustment direction Z, in particular oriented upwards, and a ramp 13b on the opposite side of the notch 13. Thus, the notches 13 have an advantageously asymmetric profile. The arrangement of the notches 13 on the adjustment plate 11 makes it possible to create a distance, called a pitch, between two notches 13, for example, to achieve a pitch less than or equal to 5 mm.

The headrest assembly 6 may further comprise a support structure 17. The support structure 17 comprises a front face 17a, in particular capable of supporting a head of an occupant of the seat 1, and a rear face 17b. The support structure 17 also comprises two side faces 17c respectively comprised between the front face 17a and the rear face 17b. The support structure 17, in particular the front and rear faces 17a, 17b, may be covered with padding and/or a protective cover schematically represented with phantom lines in FIG. 2. Thus, an occupant of the seat can rest his or her head on the front face 17a of the support structure 17 when seated on the seat 1.

The headrest 4 may be adjustable in the adjustment direction Z. Support structure 17 may be mounted on support structure 8 so as to be movable in translation along the adjustment direction Z. More particularly, support structure 17 is mounted on the adjustment plate 11 so as to be movable in translation along the adjustment direction Z. Support structure 17 thus makes it possible to adjust the position of the headrest 4 relative to the backrest 2. In particular, the headrest 4, specifically its support structure 17, can be adjusted between a low position and a high position.

Furthermore, the adjustment plate 11 comprises ribs 22 or advantageously deformable guide elements 23 which project and extend along the adjustment direction Z. More particularly, these ribs or guide elements 23 are located at the upper ends 25a, 25b of the pins 9a, 9b. These ribs 22 or guide elements 23 serve to guide support structure 17 as it slides on the adjustment plate 11 along the adjustment direction Z.

In order to lock the position of support structure 17 relative to the adjustment plate 11, the headrest assembly 6, in particular support structure 17, may also comprise a locking system 18.

The locking system 18 comprises at least one locking wire 19. The locking wire 19 is in particular supported and guided by support structure 17.

In particular, support structure 17 and specifically the side face 17a comprises an operating button 25. The operating button 25 is connected to the locking wire 19 by means of a cylindrical opening 26 arranged on a side face 17c of support structure 17. The operating button 25 can be actuated by a user of the seat 1 by pressing it between a locked position and an unlocked position. In the locked position, the locking wire 19 engages with at least one of the notches 13 of the adjustment plate 11 to prevent translational movement of support structure 17 along the adjustment direction Z, at least in one direction of displacement. In the unlocked position, the locking wire 19 allows translational movement of support structure 17 along the adjustment direction Z. It is then possible to adjust the position of the headrest 4 and in particular of support structure 17, with respect to the backrest 2. A return member 28, for example a spring, resiliently biases the operating button 25 towards the locked position.

Such a locking system 18 is known per se and will not be described in more detail. By way of example, document FR 13 59125 describes, for example, a height-adjustable headrest comprising a locking system for selectively locking and unlocking the support structure 17 of the headrest 4.

Support structure 8 may further comprise two sheaths 30a, 30b. More particularly, the sheaths 30a, 30b are fixed to the mounting portions 14a, 14b of the pins 9a, 9b. The sheaths 30a, 30b respectively surround the mounting portions 14a, 14b of the pins 9a, 9b. Each of the sheaths 30a, 30b may be formed by a tubular body having an axis along the adjustment direction Z. Each of the sheaths 30a, 30b also comprises a circular or square cross-section. The sheaths 30a, 30b are preferably identical to one another.

The mounting portions 14a, 14b, in particular each of the sheaths 30a, 30b, are adapted to be arranged in housings, such as sockets provided in the frame 7 of the backrest 3, or are adapted to be fixed directly to the backrest 3. It is thus possible to fix support structure 8 in a fixed manner to the backrest 2 as represented in FIG. 2.

In order to block the headrest 4 on the backrest 3, each of the sheaths 30a, 30b may further comprise a restraint system 31. In the embodiment shown in FIG. 4, the restraint system 31 comprises two restraining elements making it possible to restrain the two sheaths 30a, 30b in the backrest frame 7.

Such sheaths 30a, 30b and such a restraint system 31 are known per se and will not be described in greater detail.

Support structure 8 may further comprise an interface 15. The interface 15 interconnects the two pins 9a, 9b. More particularly, the interface 15 interconnects the intermediate portions 20a, 20b of the pins 9a, 9b. More particularly, the interface 15 connects the intermediate portions 20a, 20b of the pins 9a, 9b where the mounting portion 14a, 14b and the intermediate portion 20a, 20b meet, in order to improve the appearance of the seat 1 and more particularly the appearance of the connection between the backrest 3 and the headrest 4.

The interface 15 is solid. Solid is understood to mean in particular that the interface 15 does not comprise any discontinuities. The interface 15 connects the two pins 9a, 9b together as one piece.

The interface 15 covers each of the intermediate portions 20a, 20b of the two pins 9a, 9b. The interface 15 thus at least partially covers the intermediate portions 20a, 20b of the pins 9a, 9b.

In particular, the interface 15 may cover an external upper part of the backrest 3. More particularly, the interface 15 may cover the intermediate portions 20a, 20b of the pins 9a, 9b facing the covering system 7' of the upholstery. The interface 15 makes it possible to conceal seams and/or cuts made in the covering system in order to close it and/or allow the passage of the pins 9a, 9b. The interface 15 also makes it possible to conceal from the user the holes enabling the passage of the pins 9a, 9b and the padding present under the covering system 7'.

In particular, the interface 15 may completely cover the intermediate portions 20a, 20b of the pins 9a, 9b, located along the adjustment direction Z between the sheaths 30a, 30b and the adjustment plate 11. Alternatively, the interface 15 may completely cover the intermediate portions 20a, 20b of the pins 9a, 9b, located along the adjustment direction Z between the covering system 7' of the upholstery and the adjustment plate 11. The headrest assembly 6 thus has the appearance of a single-pin headrest 4 while being adapted to the frames 7 of standard backrests 3 for two-pin headrests 4.

As the adjustment plate 11 is located on the adjustment portions 16a, 16b of the pins 9a, 9b, the intermediate portions 20a, 20b of the pins 9a, 9b, in particular the interface 15, are not used for the height adjustment of the headrest 4. In particular, the sliding of the headrest 4 is achieved exclusively by sliding support structure 17, in particular at the adjustment portions 16a, 16b of the pins 9a, 9b. It is not necessary for the headrest 4 to slide relative to the backrest 3 at the intermediate portions 20a, 20b of the pins 9a, 9b, and in particular at the interface 15. In particular, support structure 17 can hide the interface 15 when it slides from a high position to a low position. It is thus possible to modify the appearance of the interface 15 by particular graining, recessed patterns and/or protruding patterns, the addition of color, shape, or contours, a decorative element 32 which may be colored plastic, wood, metal, or carbon. Indeed, particularly in the uppermost position of the headrest 4, support structure 17 does not cover the interface 15. Furthermore, in an intermediate position of the headrest 4, support structure 17 partially covers the interface 15. The interface 15 is thus generally visible to an occupant.

According to the invention, the adjustment plate 11 and the interface 15 are formed as one piece. "As one piece" is understood to mean that the adjustment plate 11 and the interface 15 are formed without any discontinuity in the material. Optionally, the adjustment plate 11, the interface 15, and the sheaths 30a, 30b are formed as one piece.

According to the invention, the interface 15 is overmolded on the pins 9a, 9b. More particularly, the interface 15 is overmolded on the intermediate portions 20a, 20b of the pins 9a, 9b. Optionally, the interface 15 is overmolded on the intermediate portions 20a, 20b of the pins 9a, 9b and at least partially on the adjustment plate 11. Optionally, the adjustment plate 11 and the interface 15 are overmolded on the pins 9a, 9b, the adjustment plate 11 being overmolded on the adjustment portions 16a, 16b and the interface 15 being overmolded on the intermediate portions 20a, 20b. Optionally, the adjustment plate 11, the interface 15, and the sheaths 30a, 30b are overmolded on the pins 9a, 9b, the adjustment plate 11 being overmolded on the adjustment portions 16a, 16b, the interface 15 being overmolded on the intermediate portions 20a, 20b, and the sheaths 30a, 30b being overmolded on the mounting portions 14a, 14b.

The interface 15 and/or the adjustment plate 11 and/or the sheaths 30a, 30b are preferably of plastic overmolded on the pins 9a, 9b.

Since the interface 15, the adjustment plate 11, and for example the sheaths 30a, 30b are overmolded on the pins 9a, 9b, support structure 8 is advantageously formed as one piece. "As one piece" is understood to mean that the pins 9a, 9b cannot be separated from the interface 15 and the adjustment plate 11, and where appropriate from the sheaths 30a, 30b, by a user.

In particular, support structure 8 comprises, as a single element, elements that are usually distinct and separate from one other in headrests, such as the interface, the plate, the sheaths or the ribs and guide elements. This results in a headrest 4 that is easy and economical to manufacture. The headrest 4 is also easier to use.

The invention also relates to a method for manufacturing the headrest assembly 6, in particular a method for overmolding the two pins 9a, 9b.

In a first step of the manufacturing method, the metal pins 9a, 9b are placed in a mold. In a second step of the manufacturing method, the mold is closed and the plate 11 and the interface 15 are molded by plastic injection molding, respectively overmolding the adjustment portions 16a, 16b and the intermediate portions 20a, 20b of the pins 9a, 9b. Support structure 8 is thus formed, comprising the pins 9a, 9b on which the adjustment plate 11 and the interface 15 are overmolded. As discussed above, sheaths 30a, 30b may also be overmolded in this same step around the pins 9a, 9b, in particular at the mounting portions 14a, 14b of the pins 9a, 9b.

In a variant, the adjustment plate 11 is integrally secured to the adjustment portions 16a, 16b of the metal pins 9a, 9b, and the assembly formed by the adjustment plate 11 and the pins 9a, 9b is placed in a mold. In a second step of the manufacturing method, the mold is closed and the interface 15 is molded by plastic injection molding, overmolding the intermediate portions 20a, 20b of the pins 9a, 9b and possibly at least partially the adjustment plate 11. Support structure 8 is thus formed, comprising the pins 9a, 9b and the adjustment plate 11, on which the interface 15 is overmolded. As discussed above, sheaths 30a, 30b may also be overmolded in this same step around the pins 9a, 9b, in particular at the mounting portions 14a, 14b of the pins 9a, 9b.

The pins 9a, 9b, and in particular the intermediate portion 20a, 20b of the pins 9a, 9b, are therefore covered with plastic material and are connected by said plastic material.

The present invention also relates to a seat 1 comprising a backrest 3 and a headrest 4 as described above, wherein the pins 9a, 9b are integral with the backrest 3, in particular with the frame 7 of the backrest 3, so that support structure 17 is height-adjustable relative to the backrest 3.

Obviously, the invention is not limited to the embodiments described above and provided solely by way of example. It includes various modifications, alternative forms, and other variants that the person skilled in the art can envisage within the scope of the present invention and in particular any combination of the different modes of operation described above, which can be taken separately or in combination.

The invention claimed is:

1. A headrest assembly for a vehicle seat, the headrest assembly comprising:
    two pins each extending substantially along an adjustment direction between a lower end and an upper end, each of the two pins having a mounting portion comprising the lower end and adapted to be fixed to a backrest of a seat, an adjustment portion comprising the upper end, and an intermediate portion between the mounting portion and the adjustment portion,
    a head-supporting structure adapted to support the head of a user,
    an interface made of plastic, the interface being overmolded on the intermediate portions of the two pins such that said interface interconnects said two pins and is formed with said two pins in one piece, and
    an adjustment plate integrally secured to the adjustment portion of each of the two pins, the head-supporting structure being mounted so as to be adjustable in translation on the adjustment plate along the adjustment direction.

2. Headrest assembly according to claim 1, wherein the adjustment plate is made of plastic overmolded on the adjustment portion of each of the two pins.

3. Headrest assembly according to claim 1, wherein the interface is overmolded as one piece on the pins along with the adjustment plate so as to form a support structure, the support structure being formed as a single piece.

4. Headrest assembly according to claim 1, wherein the adjustment plate is at least partially overmolded by the interface.

5. Headrest assembly according to claim 1, wherein the two pins are made of metal and wherein the intermediate portions of the pins are at least partially covered by the overmolded interface.

6. Headrest assembly according to claim 1, wherein the intermediate portions of the pins are completely covered by the overmolded interface.

7. Headrest assembly according to claim 1, wherein the interface is solid.

8. Headrest assembly according to claim 1, wherein the interface is overmolded as one piece on the intermediate portions of the pins.

9. Headrest assembly according claim 1, wherein the intermediate portion of each of the pins has an offset area with a base extending in a transverse direction perpendicular to the adjustment direction and two bends connecting said base to the other pin portions extending along the adjustment direction.

10. A method for manufacturing a headrest assembly according to claim 1, wherein the method comprises the step of:
  injection molding the interface of plastic material so as to interconnect the two pins.

11. Method according to claim 10, wherein the two metal pins are placed in a mold, and wherein the plastic injection molding is carried out in order to at least partially overmold the interface on the intermediate portion of each of the pins.

12. Method according to claim 10, further comprising the step of:
  plastic injection molding the adjustment plate while overmolding the adjustment portion of each of the pins.

13. Method according to claim 10, wherein the adjustment plate is placed in a mold, and wherein the plastic injection molding is carried out in order to at least partially overmold the interface on the adjustment plate.

14. Method according to claim 13, further comprising the steps of:
  integrally securing the adjustment plate to the adjustment portion of the two pins to form an assembly,
  placing in the mold the assembly formed by the adjustment plate and the two pins, and
  plastic injection molding the interface while overmolding the intermediate portion of the two pins and the adjustment plate.

15. A seat comprising a backrest and the headrest assembly according to claim 1, wherein the two pins are integral with the backrest.

16. Seat according to claim 15, wherein the backrest comprises an upper part from which the pins extend, and said upper part is covered by the interface.

* * * * *